United States Patent
Anulf et al.

(10) Patent No.: US 8,472,352 B2
(45) Date of Patent: Jun. 25, 2013

(54) METHOD FOR ACHIEVING A CALL-WAITING FUNCTIONALITY IN A COMMUNICATION NETWORK

(75) Inventors: Andreas Anulf, Lidingo (SE); Jorgen Axell, Danderyd (SE); Mikael Dorsberg, Tyreso (SE); John Olsson, Slatsjo-Boo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 255 days.

(21) Appl. No.: 12/997,264
(22) PCT Filed: Jul. 10, 2008
(86) PCT No.: PCT/SE2008/050862
§ 371 (c)(1), (2), (4) Date: Dec. 10, 2010
(87) PCT Pub. No.: WO2009/151360
PCT Pub. Date: Dec. 17, 2009

(65) Prior Publication Data
US 2011/0122799 A1  May 26, 2011

(30) Foreign Application Priority Data
Jun. 12, 2008 (SE) ...................... 0801370

(51) Int. Cl.
H04L 12/16 (2006.01)
H04L 12/66 (2006.01)
H04L 12/28 (2006.01)
H04L 12/56 (2006.01)
H04Q 11/00 (2006.01)
H04W 4/00 (2009.01)
H04J 3/06 (2006.01)
H04M 3/42 (2006.01)
H04M 11/00 (2006.01)
H04M 1/725 (2006.01)
H04M 1/663 (2006.01)

(52) U.S. Cl.
USPC ........... 370/259; 370/338; 370/350; 370/352; 370/411; 455/414.1; 455/406; 455/412.2

(58) Field of Classification Search
USPC ....... 370/259, 338, 350, 352, 411; 455/414.1, 455/406, 412.2
See application file for complete search history.

(56) References Cited

U.S. PATENT DOCUMENTS
2007/0165605 A1   7/2007  Nguyen et al.
2007/0213037 A1*  9/2007  Lukacs ...................... 455/414.1
(Continued)

FOREIGN PATENT DOCUMENTS
WO   2006010614 A2   2/2006
WO   2007/057874 A1  5/2007
(Continued)

OTHER PUBLICATIONS
ETSI, ISUP CW (ISUP Part 17: Call Waiting (CW), Oct. 2010, Draft EN 300 356-17 v3.1.1, pp. 1-10.*
(Continued)

*Primary Examiner* — Andrew Lai
*Assistant Examiner* — Albert Shih
(74) *Attorney, Agent, or Firm* — Coats & Bennett, P.L.L.C.

(57) ABSTRACT

An application server invocated terminating service is enabled in an IMS based communication network. A request-to-establish message is received by an application server in a terminating part of the network, initiated by a calling party associated to an originating part of the network. The request-to-establish message is supplemented with information that the terminating service is desired to a called party associated to the terminating part, before being transmitted to an access node to which the called party is associated. A called terminal used by the called party is then notified that the terminating service is applicable by the access node, before the application server is confirmed that the called terminal has been notified. Supplementing the request-to-establish message in this way, enables parties communicating over an IMS based network to use the terminating service, regardless of whether they are directly associated to the network or via a non-IMS based communications network.

10 Claims, 6 Drawing Sheets

U.S. PATENT DOCUMENTS

| | | |
|---|---|---|
| 2008/0090570 A1 | 4/2008 | Deshpande et al. |
| 2008/0123603 A1* | 5/2008 | Cai et al. .................. 370/338 |
| 2008/0130624 A1* | 6/2008 | Hua et al. ................. 370/350 |
| 2010/0111002 A1* | 5/2010 | Xu et al. .................. 370/329 |

FOREIGN PATENT DOCUMENTS

| | | |
|---|---|---|
| WO | 2007/106504 A2 | 9/2007 |
| WO | 2008014100 A2 | 1/2008 |
| WO | 2008/069949 A1 | 6/2008 |

OTHER PUBLICATIONS

3rd Generation Partnership Project. 3GPP TS 24.615, V0.3.0 (May 2008). 3rd Generation Partnership Project; Technical Specification Group Core Network and Terminals; Communication Waiting (CW) using IP Multimedia (IM) Core Network (CN) subsystem; Protocol specification; (Release 8).

* cited by examiner

METHOD FOR ACHIEVING A CALL-WAITING FUNCTIONALITY IN A COMMUNICATION NETWORK

TECHNICAL FIELD

The present invention relates generally to establishment of IMS based communication sessions.

In particular, the present invention can be used for enabling the use of an application server invocated terminating service, for a communication party.

BACKGROUND

In IMS (Internet Protocol Multimedia Subsystems) based communications networks, communication sessions are established for transmitting information between different communicating parties using communication terminals. In this description communication terminals, such as e.g. mobile phones, are associated to IMS based communications networks, and fixed telephones are associated to the IMS based communications networks via one or more access nodes. However, throughout this document, the term "communication terminal" will be used for communication terminals of any type suitable for being associated directly to IMS based communications networks, such as e.g. computers, mobile terminals, as well as for communication terminals which are suitable for being associated to IMS based communications networks indirectly via any suitable access node such as e.g. fixed telephones. Such access nodes may typically be realised as e.g. gateways.

Typically, in IMS based networks information is transmitted according to the Session Initiation Protocol (SIP), which is a well known standard. SIP is therefore not necessary to describe in more detail here.

With reference to FIG. 1a, which illustrates a scenario according to prior art, a calling party (not shown) uses a communication terminal 100 for establishing a communication session via an IMS based communications network 102 with a called party (not shown) using a fixed telephone 104. The calling communication terminal 100 associated to the IMS based communications network 102 requests for a service from an application server 106, e.g. to establish a communication session with another communication terminal 104. The called communication terminal 104, being associated to a non-IMS based communications network 108, will not able to request for a desired service directly from another application server 110 in the IMS based network 102, but will be associated to the IMS based network 102 through an access node 112, e.g. a gateway.

In general, even if a communication terminal 100 is associated directly to an IMS based communications network 102, any suitable conventional access node 114, such as e.g. a P-CSCF (Proxy Call Session Control Function) will be applied to associate the communication terminal 100 to the IMS based communications network 102. Typically, the described IMS based communications network 102 may also comprise additional conventional means to be able to operate properly, e.g. for associating the communication terminals and/or access nodes to the IMS based network 102 and for establishing the connection between the application servers 106, 110. However, for simplicity reasons, any means or functionality which is not necessary for the understanding of the described scenario has been omitted in the figure.

When establishing a communication session one of the communicating parties may be busy, or limited resources may be available for incoming communication to the party. "Call Waiting" is a service that exists today in communications networks having knowledge whether the communication parties are available for incoming calls or busy in an on-going call, for instance in ISDN/PSTN (Integrated Services Digital Network/Public Switched Telephony Network). Typically, a called party busy in another communication session or a call receives a "Call Waiting" tone when a calling party wants to initiate a call. The called party can then either toggle to the calling party, end the on-going session or call and pick up the incoming call, or notify the calling party that he is already busy in another call.

"Call Waiting" is a desired service also in IMS based networks, and for a communication party establishing a communication session with another communication party it is desired to be able to use the same services that he/she is accustomed to, irrespective of which type of communications network applied. Generally, the communication parties do not always even have knowledge regarding which type of communications networks being applied for the communication session.

However, there are some problems associated with achieving Call Waiting functionality in IMS based communications networks. IMS based communications networks do not have knowledge of whether the called party is busy in another communication session and/or have limited resources for incoming communication. Moreover, an application server in an IMS based communications network does not have knowledge of how many terminals a called party has and/or can handle. In addition, it does not even know which type of terminal(s) the called party uses. Today, it is also not even possible for the IMS based network to know if "Call Waiting" is a desired service to the called communicating party, i.e. if the called party wants to be notified regarding an incoming call during an on-going call.

SUMMARY

It is an object of the present invention to address at least some of the problems outlined above. In particular, it is an object to provide a solution which allows a relatively flexible establishment of a communication session between two communication parties. These objects and others may be achieved primarily by a solution according to the attached independent claims.

According to one aspect, a method is provided for enabling a terminating service in an IMS based communications network, comprising an originating part and a terminating part. In an application server is a request-to-establish message received from the originating part. The message is initiated by a calling party using a calling communication terminal associated to the originating part. Then the application server supplements the request-to-establish message with information that the terminating service is desired to a called party, using a called communication terminal associated to the terminating part. After being supplemented the application server transmits the request-to-establish message to an access node, via which the called communication terminal is associated. The access node notifies then the called communication terminal that the terminating service is applicable, and confirms to the application server that the called communication terminal has been notified.

Optionally the terminating service may be Call Waiting or Call Back.

According to another aspect, an application server is provided for enabling a terminating service in an IMS based communications network, comprising an originating part and a terminating part. The application server is arranged to be comprised in the terminating part, and comprises an originating communication unit, adapted to receive a request-to-establish message from the originating part on an originating communication link. Furthermore, the originating communication unit is adapted to notify the originating part on the communication link that a called communication terminal is notified regarding that the terminating service is applicable.

Moreover, the application server comprises a terminating service memory adapted to comprise information whether the terminating service is desired to a called party.

The application server comprises also a terminating communication unit adapted to transmit the request-to-establish message on a terminating communication link to the called party, the request-to-establish being supplemented with information whether the terminating service is desired to the called party. The terminating communication unit is further adapted to receive a confirmation on the terminating communication link that the called party has been notified regarding that the terminating service is applicable. Furthermore the application server comprises a Call Waiting manager adapted to supply the request-to-establish message received by the originating communication unit with information regarding that the terminating service is desired to the called party.

Optionally, the terminating communication unit may be further adapted to receive updated information from the called party, whether the terminating service is desired. The call waiting manager may be further adapted to update the terminating service memory with the received updated information.

According to a further aspect, a method is provided for enabling a terminating service in an IMS based communications network comprising an originating part and a terminating part. In a called communication terminal associated to the terminating part is a request-to-establish message received from an application server in the terminating part. The message is supplemented with information that the terminating service is desired to a called party. Furthermore, the message is initiated by a calling party using a calling communication terminal associated to the originating part. The called communication terminal confirms then to the application server that it has been notified regarding that the terminating service is applicable.

According to yet another aspect, a called communication terminal is provided for enabling a terminating service to an IMS based communications network comprising an originating part and a terminating part. The called communication terminal is arranged to be associated to the terminating part, and comprises a communication unit adapted to receive a request-to-establish message from an Application server in the terminating part on a communication link. The message is supplemented with information that the terminating service is desired, and is initiated by a calling party using a calling communication terminal associated to the originating part. Furthermore, the communication unit is adapted to transmit a confirmation message to the application server on the communication link, indicating that the called communication terminal has been notified that the terminating service is applicable. Moreover, the called communication terminal is also adapted to receive the request-to-establish message and generate the confirmation message in response, to be sent by the communication unit.

According to a further aspect, a method is provided for enabling a terminating service in an IMS based communications network comprising an originating part and a terminating part. A request-to-establish message is received by an access node in the terminating part, from an application server in the terminating part. The message is supplemented with information that the terminating service is desired to a called party using a called communication terminal associated to the access node via a non-IMS based communications network, and is initiated by a calling party using a calling communication terminal associated to the originating part. Then the access node notifies the called communication terminal that the terminating service is applicable, and confirms to the application server that the called communication terminal has been notified regarding that the terminating service is applicable.

According to a further aspect, an access node is provided for enabling a terminating service in an IMS based communications network comprising an originating part and a terminating part. The access node is arranged to be associated to the terminating part and further arranged to associate a non-IMS based communications network to the terminating part.

The access node comprises a first communication unit adapted to receive a request-to-establish message from an Application server in the terminating part on a first communication link. The message will be supplemented with information that the terminating service is desired to a called party using a called communication terminal associated to the non-IMS based communications network.

Moreover, the request-to-establish message is initiated by a calling party using a calling communication terminal associated to the originating part. The first communication unit is further adapted to transmit a confirmation message to the application server on the first communication link, indicating that the called communication terminal has been notified that the terminating service is applicable.

Furthermore, the access node comprises also a terminating service manager, adapted to receive the request-to-establish message and generate a terminating service notification to be sent to the called communication terminal. The terminating service manager is further adapted to generate the confirmation message to be sent by the first communication unit.

Furthermore, the access node comprises a second communication unit (706) adapted to transmit the generated terminating service notification on a second communication link to a called communications terminal used by a called party.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a solution where communication parties, establishing a communication session over an IMS based communications network can use a terminating service, regardless of whether they are associated directly to the IMS based communications network, or via a second communications network. By supplementing a request-to-establish message, transmitted from an application server, with information whether a terminating service, as e.g. Call Waiting, is desired to a called party, an access node to which a terminal used by the called party being associated can be notified regarding that a call is waiting. The called party, being busy in another call or session, can then either pick up the call or notify that he is busy.

It is to be understood that the IMS based communications networks described in this document also comprises additional conventional nodes providing common functionality to the networks, such as e.g. communication functionality, for enabling common functions and features to operate properly. Typical additional nodes are: Proxy servers, originating application servers, Home Subscriber Servers, various access nodes, etc. However, for simplicity reasons, any means or functionality which is not necessary for the understanding of the proposed terminating services has been omitted in the figure, and will not be discussed in any further detail in this presentation.

Throughout this description, the term "associated" refers to wirelessly or fixed connected and/or registered. The IMS based communications networks referred to comprise an "originating part" to which an initiating/calling party in a communication session, using a calling communication terminal is associated. Moreover, the IMS based communications network also comprises a "terminating part" to which a terminating/called party in the communication session, using a called communication terminal is associated.

Figure 1A:
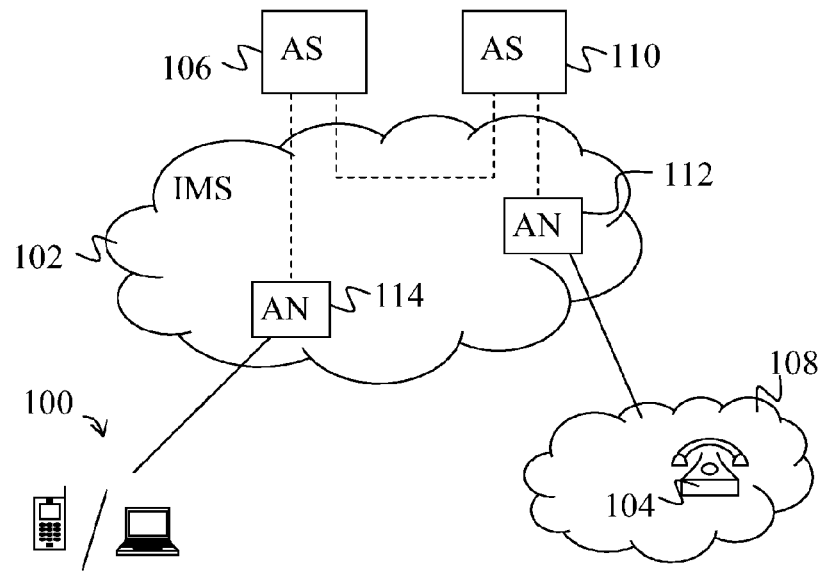
FIG. 1a is a basic overview illustrating a scenario with two communication terminals associated to an IMS based communications network, according to prior art.
Figure 1B:
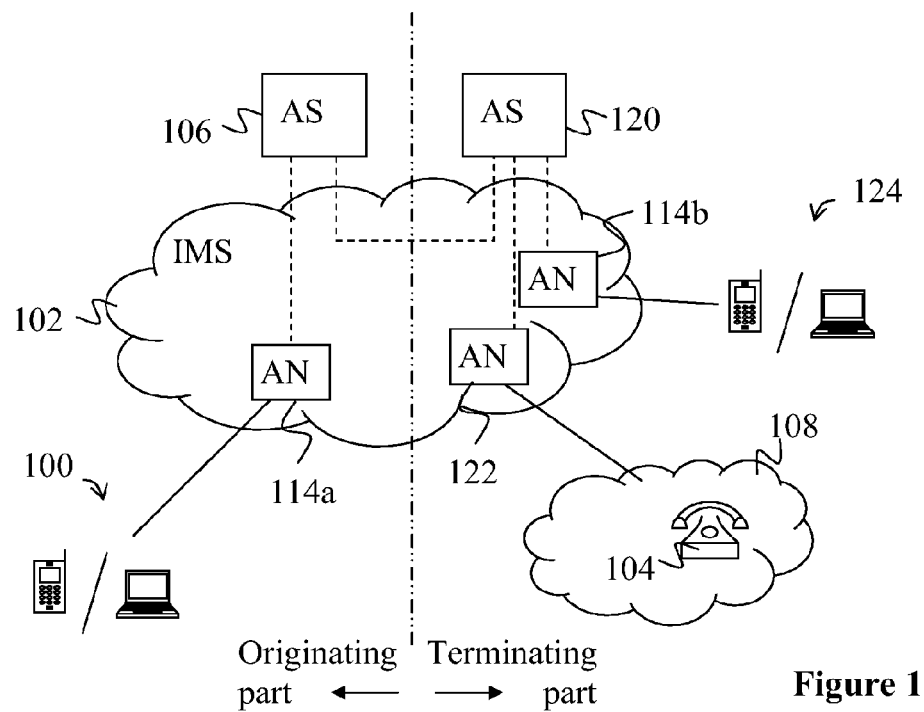
FIG. 1b is a basic overview illustrating a scenario with two communication terminals associated to an IMS based communications network, in accordance with one embodiment.

With reference to FIG. 1b, which illustrates a scenario according to the present invention, a calling party (not shown) uses a communication terminal 100 for establishing a communication session via an IMS based communications network 102 with a called party (not shown) using a fixed telephone 104. The calling communication terminal 100 associated to an originating part of the IMS based communications network 102 via any conventional access node 114a, such as e.g. a P-CSCF (Proxy Call Session Control Function), requests to an application server 106, to establish a communication session with another communication terminal 104. The called communication terminal 104, being associated to a non-IMS based communications network 108, will not able to request for a desired service directly from another application server 120 in the IMS based network 102, but will be associated to a terminating part of the IMS based communications network 102 through an access node 122, such as e.g. a gateway. In addition, another type of called communication terminal 124 may be associated to the terminating part of the IMS based communications network 102, according to the present invention. Such a called communication terminal may be associated via any suitable conventional access node 114b, which may be realised as e.g. a P-CSCF.

Figure 2:
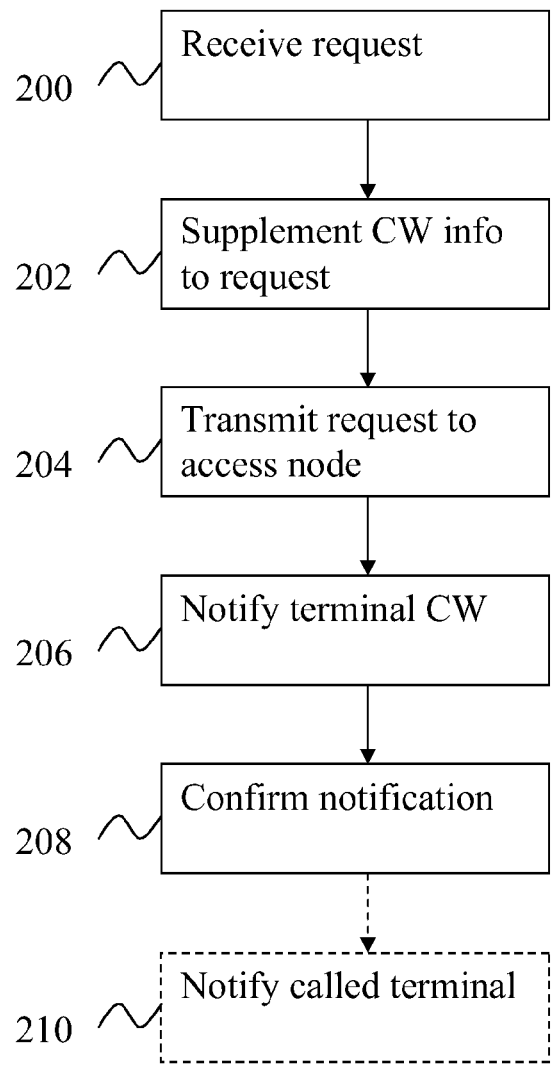
FIG. 2 is a flow chart illustrating a procedure for enabling a terminating service performed in an IMS based communications network, in accordance with another embodiment.

With reference to FIG. 2, illustrating a flow chart with steps executed in an IMS based communications network, a procedure for enabling Call Waiting functionality in the IMS based communications network in accordance with one embodiment will now be described.

In a first step 200, an application server in a terminating part of the IMS based communications network receives a request-to-establish message from an originating part of the IMS based communications network, the message being initiated by a calling party using a calling communication terminal associated to the originating part of the IMS based communications network. The received request-to-establish message may e.g. be realised as the SIP header: <INVITE>, <RequestURI: bob@operator.com>.

In a next step 202, the application server supplements the request-to-establish message with information that Call Waiting (CW) is a desired service to a called party, using a called communication terminal associated to the terminating part of the IMS based communications network. Prior to step 202, the application server has been storing information regarding whether Call Waiting is a desired service to the called party or not. The information may be stored in the application server itself, or in another network node which the application server has access to. Such a network node may be realised as a Home Subscriber Server (HSS), or any other network node suitable to store such information.

In a following step 204, the application server transmits the request-to-establish message to an access node, via which the called communication terminal is associated to the terminating part, the message being supplemented with Call Waiting information. The access node may for instance be realised as a P-CSCF (Proxy Call Session Control Function), if the called communication terminal is associated directly to the IMS based communications network, or as a gateway, if the called communication terminal is associated to a non-IMS communications network. The request-to-establish message is supplemented with contact information regarding the called communication terminal.

Optionally, the contact information may be supplemented by the application server itself, or by any other suitable network node which the request-to-establish message will be transmitted via, e.g. an S-CSCF (Serving Call Session Control Function).

The request-to-establish message arriving to the access node may be realised e.g. as the SIP header:
<INVITE>, <RequestURI: sip:bob@10.10.10.1>, <P-Called-Party-ID=bob@operator.com;Call-waiting=possible>.

In a further step 206, the access node notifies the called communication terminal that a call is waiting, the called communication terminal being busy in another call. If the called communication terminal is a fixed phone or the like, associated to the IMS network via e.g. a gateway, the notification may be performed by transmitting a specific signal superposed to the on-going call. In case the called communication terminal is instead associated directly to the IMS network, the notification may be performed by forwarding the complete received SIP header, or any part(s) of it, comprising the "Call Waiting" parameter.

In a subsequent step 208, the access node confirms to the application server that the called communication terminal has been notified regarding the waiting call. The confirmation may be realised e.g. by transmitting the SIP header:
<180 Ringing>, <Contact:bob@10.10.10.1;Call-waiting=notify> to the application server.

Conventionally, information transmitted from an access node to an application server in IMS based communication networks is conveyed via some signalling node(s), as an S-CSCF. However, such signalling node(s) does not affect the confirmation and is therefore not necessary to describe in more detail.

In an optional step 210, the application server may also notify the calling communication terminal that the call is initiated to the called communication terminal. This notification may be realised by transmitting a ring tone, if the calling communication terminal is associated to the IMS based communications network via an access node in the originating part, e.g. a gateway. On the other hand, if the calling communication terminal is associated directly to the IMS based communications network, the notification may be realised by transmitting the SIP header, such as e.g.:

<180 Ringing>, <Contact: bob@10.10.10.1>.

Moreover, when receiving the confirmation from the access node, the application server may start a timer for e.g. later initiating a new request-to-establish message to the called communication terminal.

Although a procedure for enabling Call Waiting functionality in an IMS based communications network is described in this exemplary embodiment, the invention is not limited thereto. The described procedure can easily, as is realised by one skilled in the art, be adapted to be applied also to any suitable IP (Internet Protocol) based communications network, comprising a plurality of communicating parties exchanging information formatted according to SIP or the like. Furthermore, the described procedure can easily be adapted to be applied to enable any other application server invocated terminating services, which is also realised by one skilled in the art.

Moreover, the request-to-establish message received by the application server in the terminating part of the IMS based communications network, is typically distributed by various conventional network nodes in the originating part of the IMS based communications network. However, these are conventional network nodes and well-known procedures to a person skilled in the art, and are therefore not described in more detail in the embodiment above.

Figure 3:
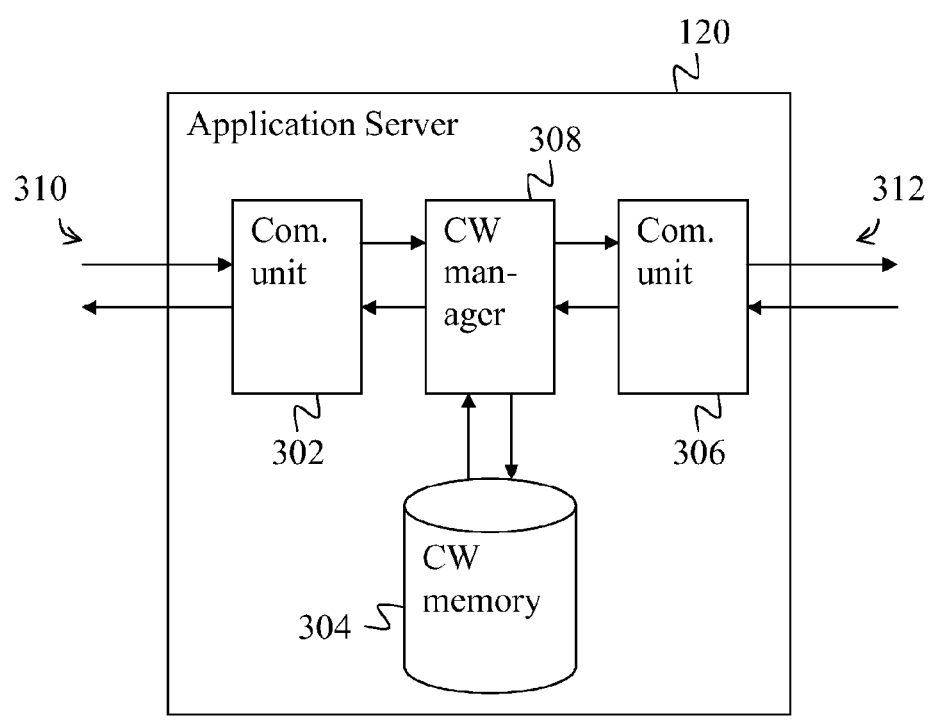
FIG. 3 is a block diagram illustrating an application server for enabling a terminating service in an IMS based communications network, in accordance with a further embodiment.

With reference to FIG. 3, illustrating a block diagram, an embodiment of an application server 120 for enabling Call Waiting functionality in an IMS based communications network will now be described. The application server 120 comprises an originating communication unit 302, a Call Waiting memory 304, a terminating communication unit 306, and a Call Waiting manager 308. The originating communication unit 302 is adapted to receive a request-to-establish message from a calling communication terminal (not shown) associated to an originating part of the IMS based communications network, the request-to-establish message being received over an originating communication link 310. Furthermore, the originating communication unit 302 may also be adapted to transmit a ring message to the calling communications terminal over the originating communication link 310. The ring message confirms that a called communications terminal associated to a terminating part of the IMS based communications network and being busy in another call, has been notified regarding that a call is waiting. The request-to-establish message may be received, and the ring message may be transmitted, via various conventional network nodes in the IMS based communications network. This is obvious to a person skilled in the art and is therefore not necessary to describe in more detail.

The Call Waiting memory 304 is adapted to store information regarding whether Call Waiting is a desired service by a called party. The Call Waiting memory 304 may not necessarily be located in the application server 120 itself, it may alternatively be located in another network node from which the application server 120 can request information regarding the desired terminating service, as mentioned in an embodiment above. Furthermore, the Call Waiting memory 304 may also be adapted to update the information regarding whether Call Waiting is desired by the called party.

The terminating communication unit 306 is adapted to transmit the received request-to-establish message to the called party (not shown) over a terminating communication link 312, the message being supplemented with information whether Call Waiting is a desired service to the called party. Furthermore, the terminating communication unit 306 is adapted to receive a confirmation message from the called communications terminal over the terminating communication link 312, the message comprising information regarding that the called party has been notified that a call is waiting. The request-to-establish message may be transmitted, and the confirmation message may be received, via various conventional network nodes in the IMS based communications network.

The Call Waiting manager 308 is adapted to supply information regarding whether "Call Waiting" is a desired service to the called party, to the received request-to-establish message. Optionally, the Call Waiting manager 308 may be further adapted to remove information indicating that the called party has been notified that a call is waiting, from the confirmation message.

Figure 4:
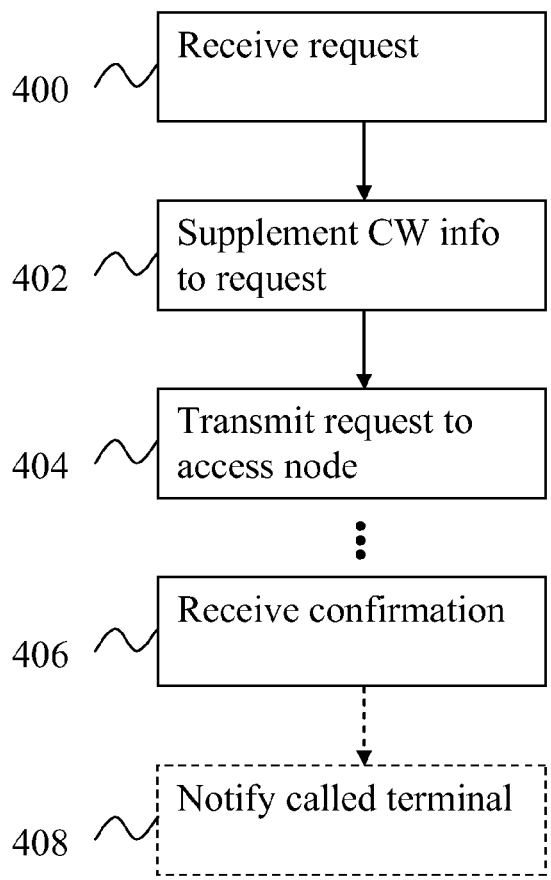
FIG. 4 is a flow chart illustrating a procedure for enabling a terminating service performed in an application server, in accordance with a further embodiment.

With reference to FIG. 4, illustrating a flow chart with steps executed in an application server in a terminating part of an IMS based communications network, a procedure for enabling Call Waiting functionality in the IMS based communications network in accordance with one embodiment will now be described.

In a first step 400, a request-to-establish message is received from an originating part of the IMS based communications network, the message being initiated by a calling party using a calling communication terminal associated to the originating part.

In a next step 402, the application server supplements the request-to-establish message with information that Call Waiting (CW) is a desired service to a called party using a called communication terminal, associated to a terminating part of the IMS based communications network. As described in an embodiment above, prior to step 402, the application server or a network node which the application server has access to, has been storing information regarding whether Call Waiting is a desired service to the called party or not.

In a following step 404, the application server transmits the request-to-establish message to an access node via which the called communication terminal is associated, the message being supplemented with information regarding that Call Waiting is a desired service to the called communication terminal. As described in an embodiment above, the type of access node depends on which type of communications network the called communication terminal is associated to. The request-to-establish message is further supplemented with contact information regarding the called communication terminal. Optionally, the contact information may be supplemented by the application server itself, or by any other suitable network node which the request-to-establish message will be transmitted via, e.g. an S-CSCF (Serving Call Session Control Function).

In a subsequent step 406, the application server receives a confirmation message from the access node, the confirmation message confirming that the called communication terminal has been notified regarding that a call is waiting.

Conventionally, as described in an embodiment above, information transmitted from an access node to an application server in IMS based communication networks is conveyed via some signalling node(s), as an S-CSCF. However, such signalling node(s) does not affect the confirmation and is therefore not necessary to describe in more detail.

In an optional step 408, the application server may also notify the calling communication terminal that the call is initiated to the called communication terminal. This notification may be realised by transmitting a ring tone if the calling communication terminal is associated to the IMS based communications network via an access node, e.g. a gateway, in the originating part. On the other hand, if the calling communication terminal is associated directly to the IMS based communications network, the notification may be realised by e.g. transmitting the SIP header: <180 Ringing>, <Contact: bob@10.10.10.1>. Moreover, when receiving the confirmation from the access node in the terminating part, the application server may start a timer for later initiation of a new request-to-establish message to the called communication terminal.

Figure 5:
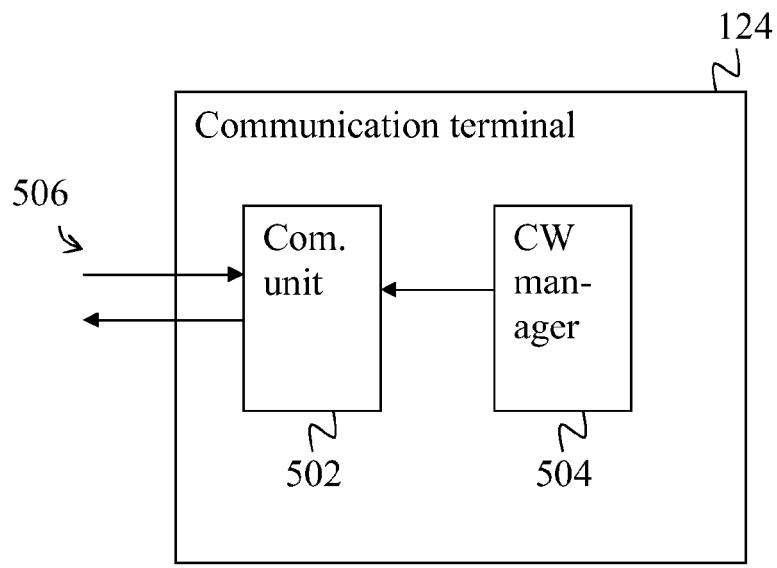
FIG. 5 is a block diagram illustrating a communication terminal for enabling use of a terminating service, in accordance with a further embodiment.

With reference to FIG. 5, illustrating a block diagram, an embodiment of a communication terminal 124 for enabling Call Waiting functionality in an IMS based communications network will now be described. The communication terminal 124 comprises a communication unit 502, and a Call Waiting manager 504. The communication unit 502 is adapted to receive a request-to-establish message supplemented with information that Call Waiting is a desired service, from an application server (not shown) in a terminating part of the IMS based communications network on a communication link 506, the request-to-establish message being initiated by a calling party using a calling communications terminal (not shown) associated to an originating part of the IMS based communications network. Furthermore, the communication unit 502 is also adapted to transmit a confirmation message indicating that the called communications terminal has been notified that a call is waiting, to the application server on the communication link 506. The Call Waiting manager 504 is adapted to receive the request-to-establish message and generate the confirmation message in response, to be sent by the communication unit 502.

Optionally, the Call Waiting manager 504 may be further adapted to generate updated information regarding whether Call Waiting is a desired service to the called party. The communication unit 502 may be further adapted to transmit the updated information to the application server in the terminating part of the IMS based communications network, to be updated.

Optionally, the Call Waiting manager may provide ordinary Call Waiting functionality in the called party, e.g. notifying that a call is waiting, enabling toggle to the incoming call, notifying that the called party is busy, etc. Furthermore, the communication unit 502 and the Call Waiting manager 504 may be performed in one and the same unit.

Figure 6:
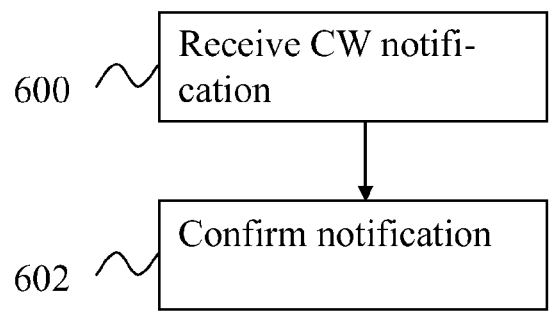
FIG. 6 is a flow chart illustrating a procedure for enabling use of a terminating service performed in a communication terminal, in accordance with a further embodiment.

With reference to FIG. 6, illustrating a flow chart with steps executed in a called communication terminal associated directly to a terminating part of an IMS based communications network, a procedure for enabling Call Waiting functionality in the IMS based communications network, in accordance with one embodiment, will now be described.

In a first step 600, a request-to-establish message supplemented with information indicating that Call Waiting is a desired service, is received from an application server in the terminating part of the IMS based communications network, the message being initiated by a calling party using a calling communication terminal, associated to an originating part of the IMS based communications network. The request-to-establish message arriving to the called communication terminal may be realised e.g. as the SIP header:
<INVITE>, <RequestURI: sip:bob@10.10.10.1>, <P-Called-Party-ID=bob@operator.com;Call-waiting=possible>.

The request-to-establish message may be transmitted via any suitable network node(s) providing common functionality in the IMS based communications network, e.g. a P-CSCF (Proxy Call Session Control Function) unit, or an S-CSCF (Proxy Call Session Control Function) unit. However, for simplicity reasons such nodes are not described in more detail, as mentioned above.

In a next step 602, the reception of the request-to-establish message is confirmed to the application server in the terminating part of the IMS based communications network. The confirmation may be realised by transmitting a SIP header: <180 Ringing>, <Contact:bob@10.10.10.1;Call-waiting=notify> to the application server.

Figure 7:
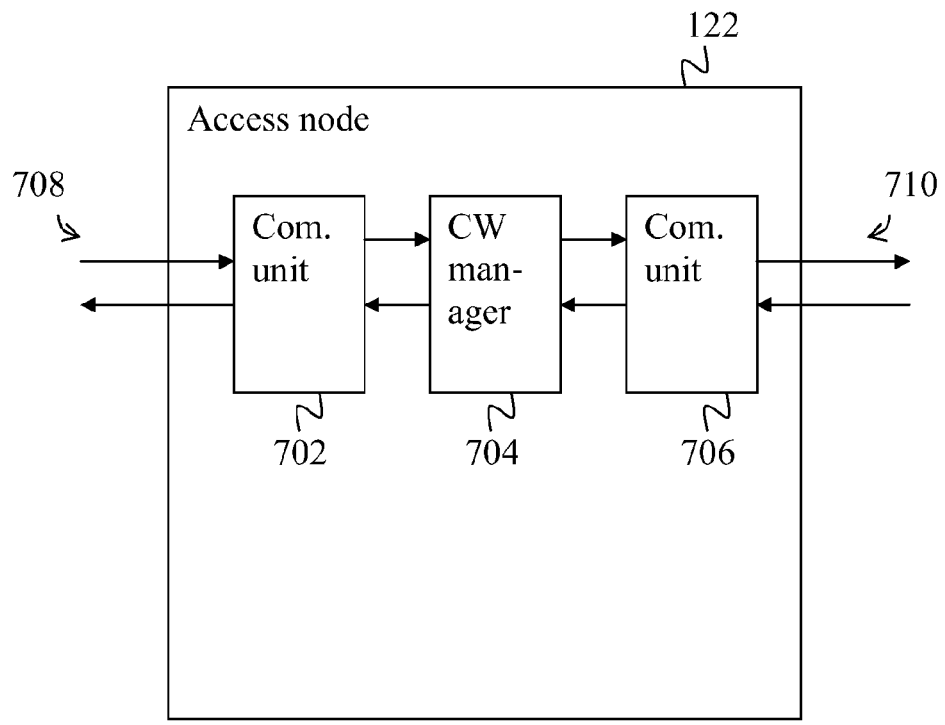
FIG. 7 is a block diagram illustrating an access node for enabling use of a terminating service, in accordance with a further embodiment.

With reference to FIG. 7, illustrating a block diagram, an embodiment of an access node 122 for enabling Call Waiting functionality in an IMS based communications network will now be described. The access node 122 is arranged to associate a non-IMS based communications network (not shown) to the IMS based communications network (not shown). One or more communication terminals (not shown) may be associated to the non-IMS based communications network. Such a non-IMS based communications network may be realised as e.g. PSTN or ISDN, in which another communication protocol than SIP may be employed. The access node 122 may be realised e.g. as a Multi Service Access Node (MSAN), Media Gateway Control Function (MGCF), Access Gateway Control Function (AGCF), or the like, suitable to communicate information with the non-IMS based communications network.

The access node 122 comprises a first communication unit 702, a Call Waiting manager 704, and a second communication unit 706. The first communication unit 702 is adapted to receive a request-to-establish message supplemented with information that Call Waiting is a desired service to a called party using a called communication terminal, from an application server in a terminating part of the IMS based communications network on a first communication link 708, the request-to-establish message being initiated by a calling party using a calling communications terminal associated to an originating part of the IMS based communications network. Furthermore, the first communication unit 702 is also adapted to transmit a confirmation message indicating that the called communications terminal has been notified that a call is waiting, to the application server on the first communication link 708.

The Call Waiting manager 704 is adapted to receive the request-to-establish message and generate a Call Waiting notification to be sent to a called communication terminal (not shown), and further adapted to generate a confirmation message in response, to be sent by the first communication unit 702. The second communication unit 706 is adapted to transmit the generated Call Waiting notification on a second communication link 710 to the called communication terminal used by a called party (not shown). However, the called communication terminal is associated to the access node 122 via a non-IMS based communications network. Therefore, the communication unit 706 is further adapted to transmit and/or receive by the second be formatted according to any communication protocol suitable for the non-IMS based communications network.

Optionally, the second communication unit 706 may be further adapted to receive information regarding whether Call Waiting is a desired service to the called party. The Call Waiting manager 704 may be further adapted to transform the received updated information according to SIP (Session Initiation Protocol), and the first communication unit 702 may be further adapted to transmit the transformed updated information to the application server in the terminating part of the IMS based communications network, to be updated.

Figure 8:
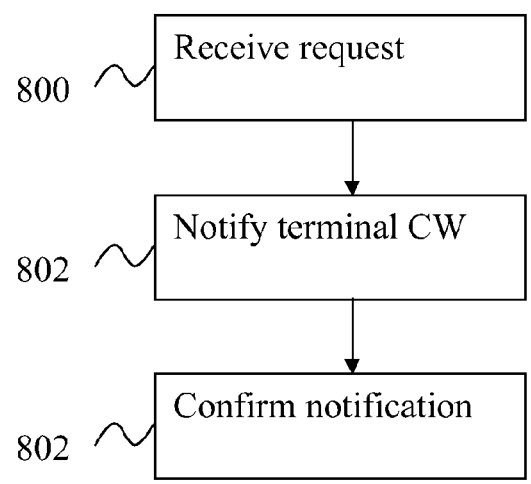
FIG. 8 is a flow chart illustrating a procedure for enabling use of a terminating service performed in an access node, in accordance with a further embodiment.

With reference to FIG. 8, illustrating a flow chart with steps executed in an access node associating a non-IMS based communications network to an IMS based communications network, a procedure for enabling Call Waiting functionality in the IMS based communications network in accordance with one embodiment will now be described.

In a first step 800, a request-to-establish message supplemented with information that Call Waiting is a desired service to a called party is received from an Application server in a terminating part of the IMS based communications network, the called party using a called communication terminal associated to the non-IMS based communications network. The request-to-establish message is initiated by a calling party using a calling communication terminal associated to an originating part of the IMS based communications network. The request-to-establish message arriving to the access node may be realised as a SIP header:
<INVITE>, <RequestURI: sip:bob@10.10.10.1>, <P-Called-Party-ID=bob@operator.com;Call-waiting=possible>.

As described in an embodiment above, the request-to-establish message may be transmitted via any suitable network node(s) providing common functionality to the IMS based communications network.

In a next step 802, the access node notifies the called terminal that a call is waiting. However, because the called communication terminal is associated to a non-IMS based communications network, this information is formatted in accordance with the protocol applied in the non-IMS based communications network. For instance, the notification may be realised as an acoustic signal superposed to an on-going call.

In a final step 804, is confirmed to the application server in the terminating part of the IMS based communications network that the notification is transmitted to the called terminal. The confirmation may be realised by transmitting the SIP header: <180 Ringing>, <Contact:bob@10.10.10.1;Call-waiting=notify> to the application server.

Furthermore, it is to be understood that the application server, the called communication terminal, and the access nodes described above in this description also comprises additional conventional means providing functionality, such as e.g. various control units and memories, necessary for enabling common functions and features to operate properly. However, for simplicity reasons, any means or functionality which is not necessary for the understanding of the proposed enabling of the terminating services has been omitted in the figures, and will not be discussed in any further detail in this description.

Although procedures and communications network nodes for enabling Call Waiting for an IMS based communications network are described in the exemplary embodiments above, the invention is not limited hitherto. The described procedures and network nodes can easily, as is realised by one skilled in the art, be adapted to be applied to any suitable terminating service invocated by an application server and desired by e.g. a terminating party. Such a terminating service may be realised as Call Back or any other suitable service, where an application server notifies a called communication terminal, or an access node to which the called communication terminal is associated, that the desired service is applicable, and the called communication terminal or the access node confirms the notification to the application server.

By means of the present invention, a flexible method for establishing a communication session is obtained. A called party being busy in another session and/or having limited capacity for a new communication session can during an on-going communication session be notified regarding a request to establish a new communication session, and is able to start a further session or end an on-going. Furthermore, by the invention a communication party can use a terminating service regardless of if he is associated directly to an IMS based communications network or indirectly via a non-IMS based communications network.

The invention is generally defined by the following independent claims.

The invention claimed is:

1. A method for enabling a Call Waiting or Call Back service in an Internet Protocol Multimedia Subsystem (IMS) based communications network that comprises an originating part to which a calling party using a calling communication terminal is associated and a terminating part to which a called party using a called communication terminal is associated, the called party associated with the terminating part via a non-IMS based communication network, the method comprising:
   receiving at an application server in the terminating part a request-to-establish message from the originating part, the request-to-establish message having been formatted in accordance with the Session Initiation Protocol (SIP) and initiated by the calling party,
   supplementing the request-to-establish message at the application server with information formatted in accordance with SIP, the information indicating that the Call Waiting or Call Back service is desired by the called party,
   transmitting the supplemented request-to-establish message from the application server to an access node via which the called communication terminal is associated with the terminating part,
   at the access node, notifying the called communication terminal that the Call Waiting or Call Back service is applicable to a waiting call, and
   sending a confirmation formatted in accordance with SIP from the access node to the application server that indicates the called communication terminal has been notified of the waiting call.

2. A method for enabling a Call Waiting or Call Back service in an Internet Protocol Multimedia Subsystem (IMS) based communications network that comprises an originating part to which a calling party using a calling communication terminal is associated and a terminating part to which a called party using a called communication terminal is associated, the called party associated with the terminating part via a non-IMS based communication network, the method executed in an application server in the terminating part and comprising:
   receiving a request-to-establish message from the originating part, the message having been formatted in accordance with the Session Initiation Protocol (SIP) and initiated by the calling party,
   supplementing the request-to-establish message with information formatted in accordance with SIP that indicates the Call Waiting or Call Back service is desired by the called party, transmitting the supplemented request-to-establish message to an access node via which the called communication terminal is associated with the terminating part, and receiving from the access node a confirmation formatted in accordance with SIP that indicates the called communication terminal has been notified that the Call Waiting or Call Back service is applicable to a waiting call.

3. An application server for enabling a Call Waiting or Call Back service in an Internet Protocol Multimedia Subsystem (IMS) based communications network that comprises an originating part to which a calling party using a calling communication terminal is associated and a terminating part to which a called party using a called communication terminal is associated, the called party associated with the terminating part via a non-IMS based communication network, the application server included in the terminating part and comprising:

an originating communication unit configured to receive a request-to-establish message from the originating part over an originating communication link, the request-to-establish message formatted in accordance with the Session Initiation Protocol (SIP), a terminating service memory configured to store information indicating whether the called party desires the Call Waiting or Call Back service, and a Call Waiting manager configured to supplement the request-to-establish message with said information, formatted in accordance with SIP, and a terminating communication unit configured to transmit the supplemented request-to-establish message over a terminating communication link to the called communication terminal, and to receive a confirmation over the terminating communication link that the called communication terminal has been notified that the Call Waiting or Call Back service is applicable to a waiting call, wherein the originating communication unit is further configured to notify the originating part over the originating communication link that the called communication terminal has been notified of the waiting call.

4. The Application server according to claim 3, wherein:
the terminating communication unit is further configured to receive updated information from the called communication terminal over the terminating communication link indicating whether the called party desires the Call Waiting or Call Back service, and the Call Waiting manager is further configured to update the terminating service memory with the received updated information.

5. A method for enabling a Call Waiting or Call Back service in an Internet Protocol Multimedia Subsystem (IMS) based communications network that comprises an originating part to which a calling party using a calling communication terminal is associated and a terminating part to which a called party using a called communication terminal is associated, the called party associated with the terminating part via a non-IMS based communication network, the method executed in the called communication terminal and comprising:

receiving from an application server in the terminating part a request-to-establish message that is formatted in accordance with the Session Initiation Protocol (SIP) and that is supplemented with information indicating that the Call Waiting or Call Back service is desired by the called party, the request-to-establish message having been initiated by the calling party, and confirm to the application server that the called communication terminal has been notified that the Call Waiting or Call Back service is applicable to a waiting call.

6. A communication terminal configured for enabling a Call Waiting or Call Back service in an Internet Protocol Multimedia Subsystem (IMS) based communications network that comprises an originating part to which a calling party using a calling communication terminal is associated and a terminating part to which a called party using the communication terminal as a called communication terminal is associated, the called party associated with the terminating part via a non-IMS based communication network, the called communication terminal comprising:

a communication unit configured to receive a request-to-establish message from an application server in the terminating part over a communication link, the request-to-establish message having been formatted in accordance with the Session Initiation Protocol (SIP), supplemented with information indicating that the Call Waiting or Call Back service is desired by the called party, and initiated by the calling party, and a terminating service manager configured to generate a confirmation message responsive to the communicating unit receiving the request-to-establish message, the confirmation message formatted in accordance with SIP and indicating that the called communication terminal has been notified that the Call Waiting or Call Back service is applicable to a waiting call wherein the communication unit is further configured to transmit the confirmation message to the application server over the communication link.

7. The communication terminal according to claim 6, wherein:
the terminating service manager is further configured to generate updated information regarding whether the Call Waiting or Call Back service is desired by the called party, and the communication unit is further configured to transmit the updated information to the application server.

8. A method for enabling a Call Waiting or Call Back service in an IMS based communications network that comprises an originating part to which a calling party using a calling communication terminal is associated and a terminating part to which a called party using a called communication terminal is associated, the called party associated with the terminating part via a non-IMS based communication network, the method executed in an access node associated to the terminating part and comprising:

receiving a request-to-establish message from an application server in the terminating part, the request-to-establish message having been formatted in accordance with the Session Initiation Protocol (SIP), supplemented with information indicating that the Call Waiting or Call Back service is desired by the called party, and initiated by the calling party, notifying the called communication terminal that the Call Waiting or Call Back service is applicable to a waiting call, and confirming to the application server that the called communication terminal has been notified that the Call Waiting or Call Back service is applicable to the waiting call.

9. An access node for enabling a Call Waiting or Call Back service in an Internet Protocol Multimedia Subsystem (IMS) based communications network that comprises an originating part to which a calling party using a calling communication terminal is associated and a terminating part to which a called party using a called communication terminal is associated, the called party associated with the terminating part via a non-IMS based communication network, the access node associating that non-IMS based communications network to the terminating part and comprising:
- a first communication unit configured to receive a request-to-establish message from an application server in the terminating part over a first communication link, the request-to-establish message having been formatted in accordance with the Session Initiation Protocol (SIP), supplemented with information indicating that the Call Waiting or Call Back service is desired by the called party, and initiated by the calling party,
- a terminating service manager configured to receive the request-to-establish message and generate a terminating service notification to be sent to the called communication terminal, and
- a second communication unit configured to transmit the generated terminating service notification to the called communication terminal over a second communication link, wherein the terminating service manager is further configured to generate a confirmation message that is formatted in accordance with SIP and that indicates the called communication terminal has been notified that the Call Waiting or Call Back service is applicable to a waiting call, and wherein the first communication unit is further configured to transmit the confirmation message to the application server over the first communication link.

10. The access node according to claim 9, wherein:

the second communication unit is further configured to receive updated information indicating whether the Call Waiting or Call Back service is desired by the called party, the terminating service manager is further configured to transform the updated information according to SIP, and the first communication unit is further configured to transmit the transformed updated information to the application server.

* * * * *

UNITED STATES PATENT AND TRADEMARK OFFICE
CERTIFICATE OF CORRECTION

PATENT NO. : 8,472,352 B2  
APPLICATION NO. : 12/997264  
DATED : June 25, 2013  
INVENTOR(S) : Anulf et al.

Page 1 of 1

It is certified that error appears in the above-identified patent and that said Letters Patent is hereby corrected as shown below:

On the Title Page, in item (75), under "Inventors", in Column 1, Line 1,
delete "Jorgen" and insert -- Jörgen, --, therefor.

On the Title Page, in item (75), under "Inventors", in Column 1, Line 3,
delete "Dorsberg," and insert -- Forsberg, --, therefor.

In the Drawings

In Fig. 8, Sheet 6 of 6, delete " 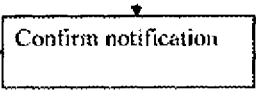 " and insert 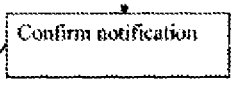 --, therefor.

In the Specifications

In Column 2, Line 5, delete "Telephony" and insert -- Telephone --, therefor.

In the Claims

In Column 14, Line 28, in Claim 6, delete "call" and insert -- call, --, therefor.

Signed and Sealed this
Twenty-eighth Day of January, 2014

Michelle K. Lee
*Deputy Director of the United States Patent and Trademark Office*